INVENTOR.
WILLIAM B. ELMER

United States Patent Office 3,428,397
Patented Feb. 18, 1969

3,428,397
ILLUMINATION IN OPTICAL IMAGING APPARATUS
William B. Elmer, Boston, Mass., assignor to Dennison Manufacturing Company, Framingham, Mass., a corporation of Nevada
Continuation-in-part of application Ser. No. 587,286, Oct. 17, 1966. This application Dec. 28, 1967, Ser. No. 701,517
U.S. Cl. 355—11                    30 Claims
Int. Cl. G03b 27/54

ABSTRACT OF THE DISCLOSURE

An office copier with a transparent window holding an original document illuminated by a light box has a lens for focussing an image of the original on electrosensitive paper. Symmetrical arrays of light reflectors project light on the window, each array including a curved reflector adjacent an elongate light source and a second non-specular, light-diffusing surface between the light source and the window. The curved reflector distributes light along the second reflector so that the window is illuminated predominantly only with diffuse light distributed more intensely toward the end of the window than toward its center.

---

This application is a continuation-in-part of my co-pending application Ser. No. 587,286, filed Oct. 17, 1966, and now abandoned, entitled, "Illumination Optical Imaging Apparatus."

In office copiers, for example, an original document is laid on or fed to a glass platen and illuminated through the platen by a light source usually comprising two or more lamps. Light reflected by the original back through the platen is imaged by the objective lens on a print window or image plane holding a photo-sensitive sheet, of electrostatic paper for example. One well known problem with such copiers arises from uneven illumination of the image window resulting from light attrition and vignetting inherent in the lens usually employed. A second problem arises from specular reflections from the record or objective or record window platen to the lens. Such specular reflections are imaged by the lens as bright striations or zones on the image window and produce corresponding irregularities in the density of the print.

Hitherto it has been considered necessary to illuminate the platen with indirect specularly reflected rays incident on the platen at angles preventing specular reflection from the platen to the lens. The paths of specularly reflected rays, in contrast to diffuse reflected light, can be controlled to avoid the second problem of specular reflection to the lens by careful adjustment of specular reflectors and their light sources. But the first problem of uneven lighting of the image window is also critically dependent upon adjustment of the reflectors and light source. Adjustment to correct the second difficulty may exaggerate the first difficulty and in any case the adjustment is time-consuming and expensive. Lamps must be carefully matched for equal intensity. And since their filaments or arc discharge chambers vary in dimension and location, the lamps must be individually positioned and their reflectors then individually adjusted to assure even illumination of the image window.

It is the primary object of the present invention to provide a printer lighting system which not only reduces specular reflection or transmission from the objective window to the lens to an insignificant proportion, but also minimizes light source and reflector adjustment.

According to the invention optical imaging apparatus comprises an objective window receiving an original record, means defining an image plane, a lens between the window and plane for focussing an image of the original on the plane, a light source, a first reflector adjacent said light source and a second reflector between said light source and one end of said objective window and means masking direct rays from the source and first reflector to points on said window reflecting light to said lens, characterized in that said first reflector is shaped to distribute more light on portions of the second reflector closer to the objective window and said second reflector has a nonspecular, light-diffusing surface, so that said objective window is illuminated predominantly with diffuse light distributed more intensely toward the end of said objective window than at the center.

I have found that contrary to prior expectations a record window platen illuminated with diffuse light, as described above, specularly reflects to the lens an insignificant proportion of the incident diffuse light. And, because all points of the record window are illuminated by all points of the non-specular, diffuse second reflector, even, striation-free illumination of the print window results with substantially no adjustment of the reflectors and without compensation for lamp variations.

For the purpose of illustration a typical embodiment of the invention is shown in the accompanying drawings in which.

Figure 1:
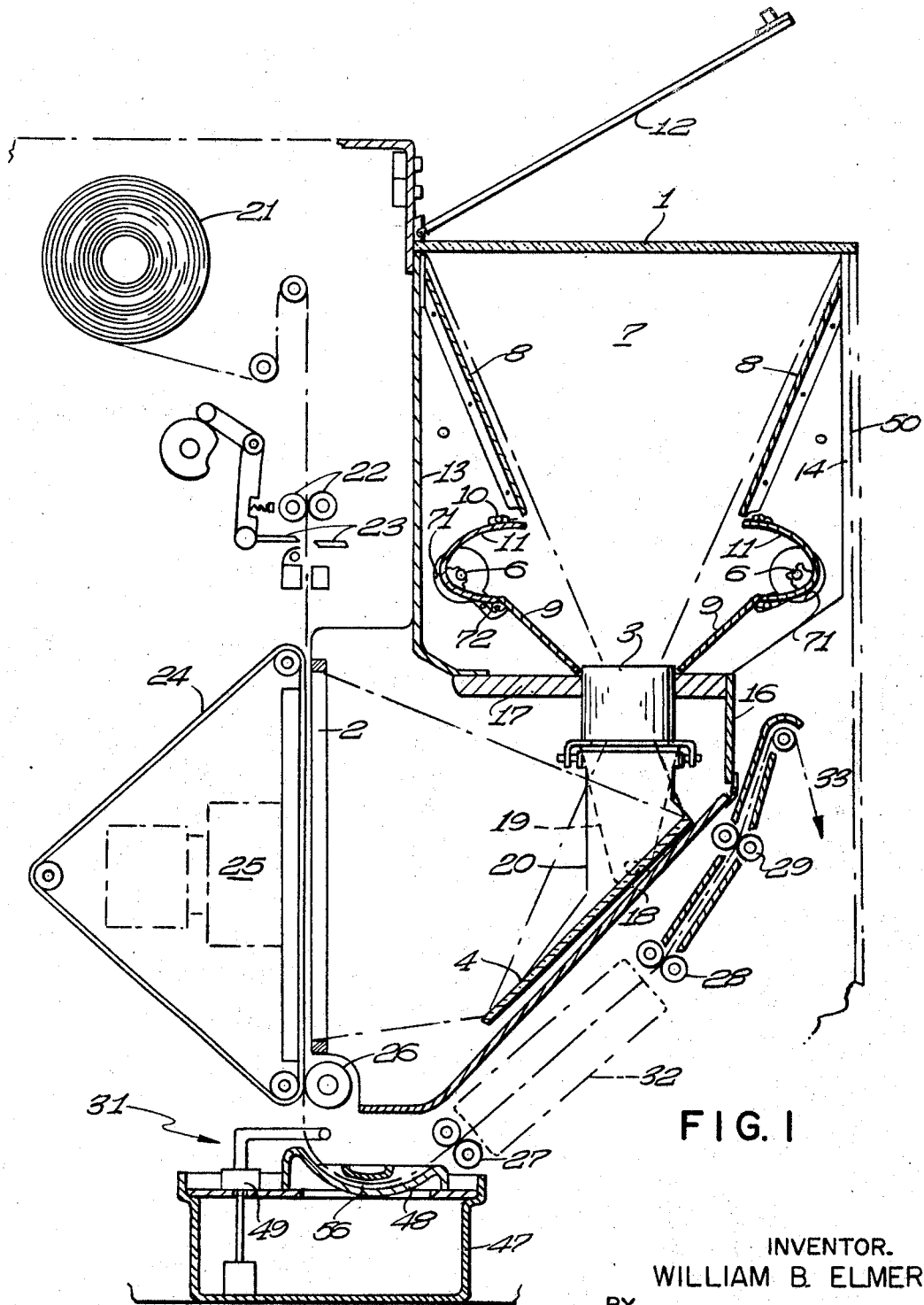
FIG. 1 is a side elevation of an office copier printer shown partly in section.

As shown in FIG. 1 an electrostatic office copier comprises a glass platen or record window 1 for supporting the record to be copied, an exposure window 2 for the paper to be printed and therebetween a lens 3 and mirror 4 for focussing an image of the record on the exposure window. The record is illuminated by lamps 6 in a light box having end walls 7 and side walls 8 and 9, all of the walls being reflective and the side walls converging toward the lens. The lamps are elongate tubes parallel to the side walls. Behind each lamp is a trough-shaped reflector 11. Access to the lamps 6 is had through clearance openings 71 in the end walls 7. Over the record window is a cover or blanket 12 for holding a record flat against the window 1. The cover is pivotally mounted to swing to the open position shown and it is removable to permit books to be printed.

The optical parts are mounted on a frame comprising the aforesaid end walls 7, vertical walls 13 and 14, a horizontal wall 17, an inclined wall 18 and a door 16 hinged to the upper end of the inclined wall. The lens is mounted in an opening in partition 17 and the mirror 4 is adjustably mounted on the lens mount by means of brackets 19 and 20.

The paper to be printed is fed from a roll 21 over guide rolls by feed rolls 22 and cut into lengths by a cutter 23. After the cutter the paper is fed past an electric paper charger to the exposure window 2 by belts 24, the sheet being held against the belts by a suction device 25. From this window each sheet is fed by rollers 26, 27, 28 and 29, first through a developer unit 31 and thence through a drier 32 to a delivery station 33. By using a stroboscopic type of short duration flash discharge lamp the paper may be exposed while advancing. The sheets should be exposed while centered on the optical axis so that they are exposed equally top and bottom. To accomplish this the stroboscopic lamps 6 are triggered by a control circuit, not shown.

The developer unit 31 comprises a tank 47, a tray 48 above the tank, and a pump 49 for supplying developer to the tray. The developer is pumped to the tray from the tank and flows back into the tank over the upper edge of the tray. The developer adhering to the surfaces of the paper is squeeged off by rollers 27. Disposed in the tray is a guide 56 curved to parallel the path of the paper in close juxtaposition to the paper.

The elements described are enclosed in a conventional light-tight housing 50.

Figure 2:
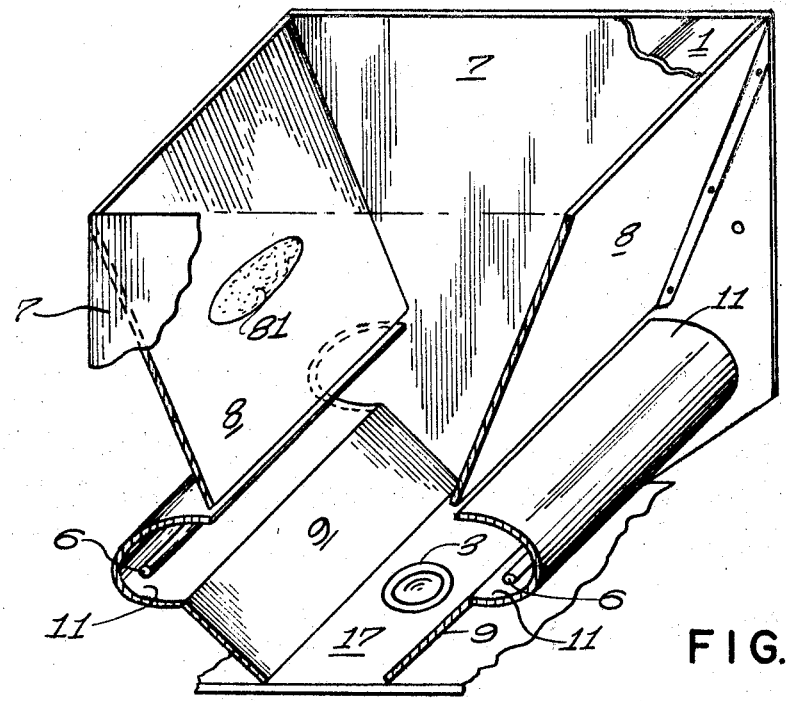
FIG. 2 is an isometric view of the illuminating system of the printer.
Figure 3:
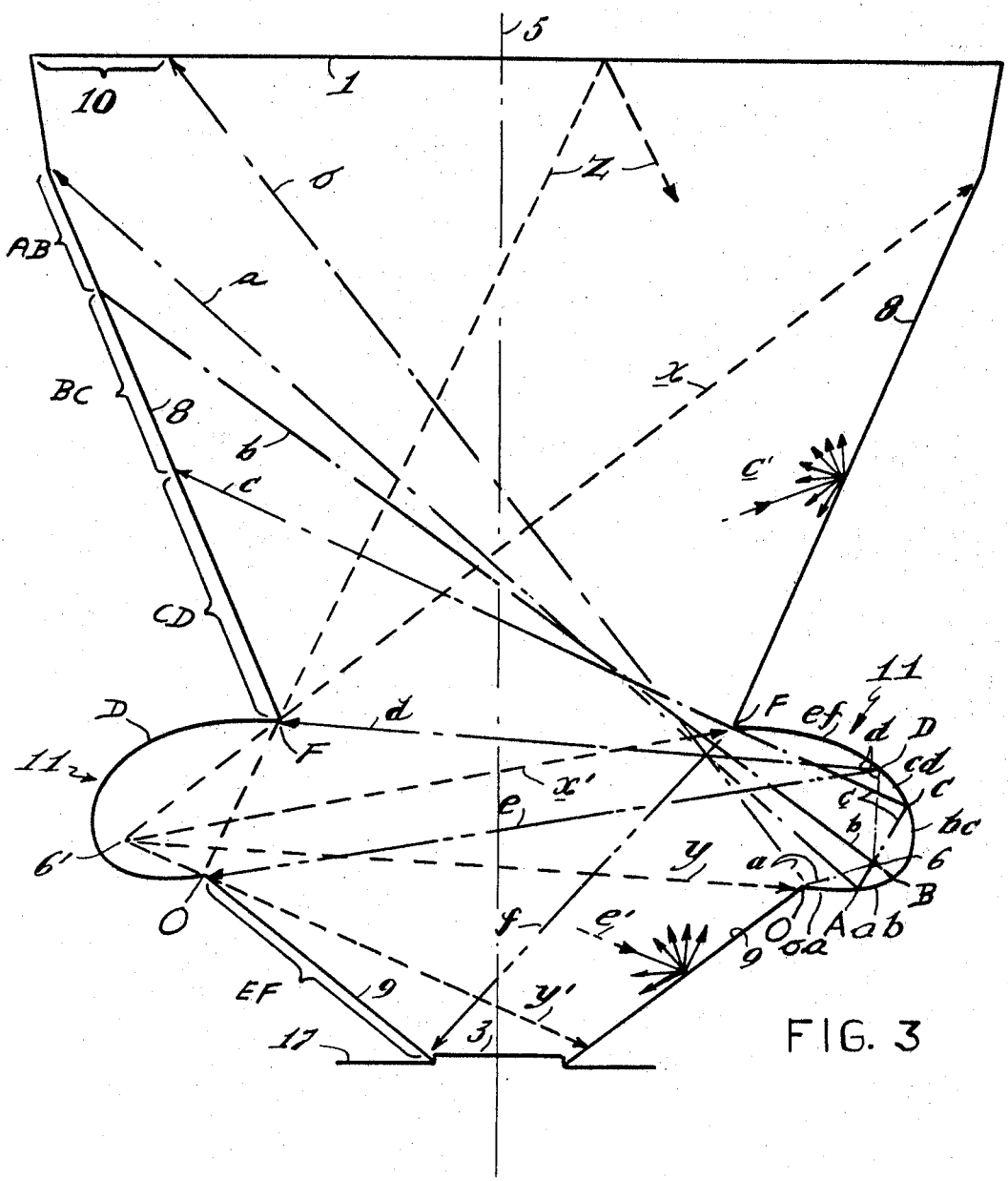
FIG. 3 is a schematic drawing of the illuminating optical system of the printer.

The illuminating optics shown in detail in FIGS. 2 and 3 are in a light box comprising the glass platen 1, the end walls 7, the side walls 8 and 9, reflectors 11 and the horizontal wall 17 through which the lens barrel 3 extends. In a typical document copier the platen 1 is approximately nine by fifteen inches. The platen 1 and lens 3 are centered on an axis 5 and are spaced apart about fifteen inches. An $f6.3$ lens with an attrition factor of secant fifth is suitable for such a copier. Lens attrition means the relative reduction of light entering the lens from an angle to the central axis 5. In the lens described, light is reduced by the fifth power of the secant of the angle at which it enters the lens. Because of this attrition, light from the edges of the platen is reduced more than light from the center, and to assure that light is evenly distributed on the print window 2, the edges of the platen or record window 1 must be more brightly illuminated than the center.

The primary illumination of the platen is by direction of light from the lamps by the trough-shaped specular reflectors 11 onto the walls 8 from which light is reflected to the platen 1. According to the present invention the walls 8 have nonspecular diffuse reflecting surfaces. The side walls 8 are sloped from opposite edges of the platen 1 inwardly of the platen toward the lens 3. Although the slope angle is not critical it may, for example, be about 25°. The lower edge of each side wall 8 is close to and adjacent the upper edge F of one trough-shaped reflector 11. In FIG. 3 each lamp 6 is represented by a point 6' representing the light center of the lamp. This light center is fixed by clamping the tubular lamps in plastic jaws 61 mounted on the reflector 11. The upper edge F and lower edge A of the reflector 11 are located such that the upper portion of the reflector 11 to the edge F masks any specular light ray from the edge A from striking the platen at a point from which the ray could be specularly reflected by the glass surface of the platen back toward the lens. For example, the innermost specular ray $z$ strikes the platen at an angle such that it can be reflected only to the diffuse reflecting wall 8, and cannot reflect to the lens or to the specular reflectors 11. Each wall is sloped from the lower edge A of the reflector 11 to the lens barrel 3 at an angle which is not critical, but which, for example, may be adjusted about an angle of 50° to the central axis 5.

The specular reflectors 11 comprise two integral portions. One portion is continuously curved between its lower edge A and a point D. This portion reflects light to the opposite wall 8. The second portion $ef$ between points D and F reflects light to the opposite wall 9. Corresponding to the gap between each pair of walls 8 and 9, there is an optical discontinuity at point D between the first and second portions of reflector 11.

Figure 4:
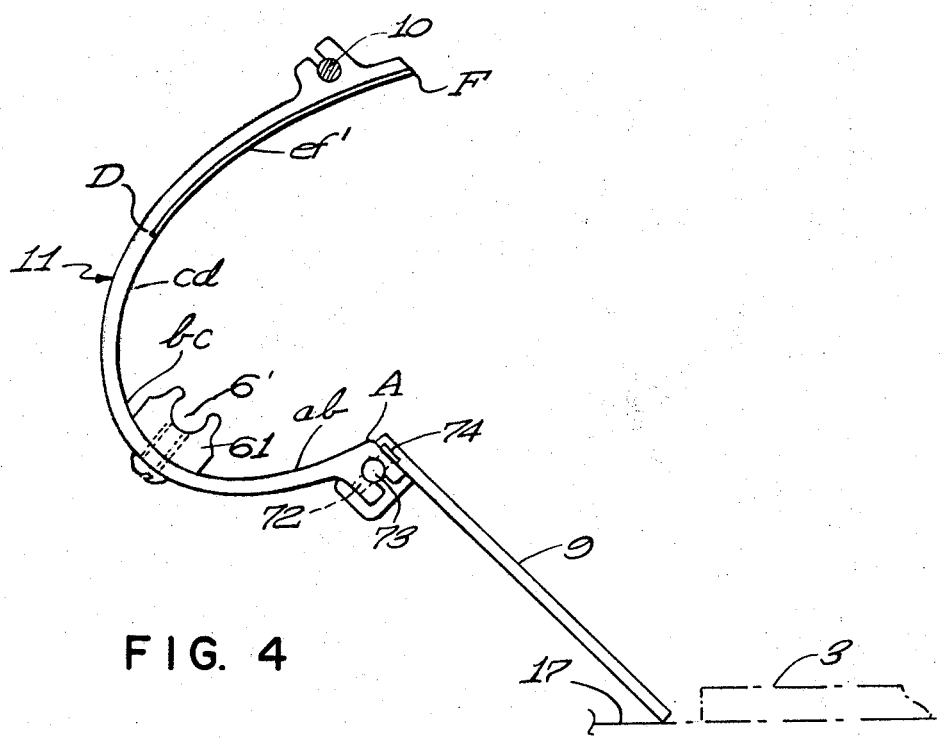
FIG. 4 is an end view of one of the reflectors of the system.

Each curved portion of reflector 11 is generated by known optical design methods with respect to the intensity of illumination desired on the walls 8 and 9. To compensate for lens attrition it has been found that the upper two inches AB of wall 8 should receive not less than three times, and the mid three inches BC not less than two times, the illumination as the lower end CD of wall 8 and the area EF of wall 9. Walls 8 and 9 will receive light both directly and by reflection from the light center 6'. Dashed lines $x$ and $x'$ indicate the angle within which direct rays fall on wall 8. Dashed lines $y$ and $y'$ are the extreme direct rays to the wall 9. The intensity of the direct illumination can be readily computed and subtracted from the desired total of direct and reflected illumination of walls 8 and 9. The curves of the specular reflectors are then generated incrementally to yield the desired proportion of reflective illumination on the walls 8 and 9. For example, the portion $ab$ of reflector 11 between points A and B is generated increment by increment to produce the desired light intensity on corresponding increments of the portion AB of the opposite wall 8. Dot-dash lines $a$ and $b$ designate the extreme rays reflected by the reflector portion $ab$ to the wall portion AB. Reflector portions $bc$ between points B and C, and $cd$ between points C and D are generated to produce lesser illumination of areas BC and CD of wall 8, on which fall the extreme rays $b$, $c$ and $d$. The curve is continuous between points A and D but breaks at a tangent angle of about 7° at point D. From point D to F the curve $ef$ is generated to produce substantially uniform lighting of the area EF of wall 9 which receives extreme rays $e$ and $f$. The curved portion $ef$ may be either specular or diffuse reflecting. In the latter case a pebbled aluminum sheet $ef'$ is inlaid in the otherwise specular reflecting surface of reflector 11, as shown in FIG. 4.

While the polished metal reflector 11 directs light specularly over the walls 8 and 9, these walls reflect the incident light in a nonspecular, diffuse manner, that is, in all directions without regard to the angle of the incident rays. Such diffuse reflection may be obtained by coating the wall surfaces with a flat or matte white paint of high, e.g., 90%, reflectivity. Such a paint is commonly available for coating the inner surface of photometric spheres. Substantially every point of the surfaces of walls 8 and 9 diffusely illuminates the platen or record window 1 and the record behind it on the first reflection from the walls. Some of the light diffused from the walls and some specularly reflected from the platen again strikes the walls and is diffused partially toward the platen. Since the walls 8 and 9 comprise most of the reflective surface within the light box, most of such secondary and further reflections are again incident on the diffuse reflecting walls. Thus multiple reflections contribute to the illumination of the platen.

As is explained in more detail the lower edges of the wall 9 rest on the horizontal wall 17 surrounding the lens 3. This wall 17 is also coated with diffuse reflecting paint to contribute to total light utilization within the light box.

The vertical end walls 7 are also highly reflective, e.g., 80% or higher, preferably specularly. Such walls mirror the diffuse side walls and add to their reflection. Specular rays incident on the end walls 7 do not, on subsequent reflection strike the lens 3 for the reason that all such rays are masked by the portions $ef$ of reflectors 11 from angles reflective to the lens by the same optical geometry controlling rays such as $z$ from the light centers 6 or the reflectors 11.

Some of the diffuse reflected light will strike the specular reflecting under surface of the platen 1 at an angle allowing specular reflection to the lens. It has been found, however, that quite contrary to prior belief this specular reflection is such a small percentage of the general brilliant reflection from the diffusely illuminated original copy on the platen that it is negligible in effect on the print window 2. Moreover, since the platen receives substantially only diffuse light, the specular reflection from the platen will be distributed evenly over the print window. Probably for these two reasons striated bands and spotty zones do not appear at the print windows.

Since substantially all the light box surfaces contribute diffuse light to the record window platen, the illumination is not only more efficient and brilliant for a given light source, but also no critical adjustment of the lamps 6 in the reflectors 11 or of the reflector 11 with respect to the walls 8 and 9, as is the case with specular reflection illuminated platens. The lamps 6 need not be so carefully balanced since both contribute to illumination of the whole platen from many angles. Although adjustment is usually not needed, a simple adjustment is provided by pivoting each reflector 11 at or near its upper linear edge F parallel to the lower edge of wall 8 on pins 10 on the walls 7. Adjustment of the reflectors 11 around this pivot moves the differently illuminated areas AB, BC and CD along the walls 8. The lower wall 9 may be fixed to the reflector 11 as shown at the right reflector 11 of FIG. 1. Or, as shown at the left reflector 11 of FIG. 1 and in FIG. 4, the wall 9 may be pivoted in jaws 72 on the reflector 9 to swing about a pivot 73 relative to the reflector 11. In this case the lower end of the wall rests on and is guided by the horizontal wall 17. A screw 74 tightens the jaw 72 to hold both the wall 9 and trough-shaped reflector 11 in adjusted position. There is then no light loss through a gap between walls 9 and 17 and the wall 9 adjusts to a new angle with respect to the platen to compensate for movement away from the lens 3.

Illumination of the sloped walls 8 and hence the light window 1 may also be controlled by coating an area 81 of the walls 8 with grey, diffuse reflecting patches, which reduce illumination of the center of the platen window. Such a patch produces higher illumination of the corners of the platen. Similarly the end walls 7 may be modified by patches of different reflectivity to control platen illumination, particularly at the adjacent platen edges by diffuse reflecting strips at the upper edges of end walls 7. Additional light control at the corners may be obtained by selecting lamps which are brighter at their ends than at their midportions.

While one desirable embodiment of the invention has herein been disclosed by way of example, it is to be understood that the invention is broadly inclusive of any and all modifications falling within the terms of the appended claims. For example, the minimum ratios three and two times the illumination of areas AB and BC of wall 8 may be substantially increased in some embodiments of the invention. As a second example, illustrated in FIG. 3, the illumination of the ends of the platen may be reinforced by a small amount of first reflected light from area *oa* between points O and A of reflector 11, which light is caused to spill upward directly onto the end area 10 of the platen 1 by an upward tilting adjustment of both reflectors 11 as indicated by extreme ray *o*. When this modification of the invention is employed, the minimum above-mentioned ratios of three and two times may be reduced below these levels and satisfactory prints may be obtained with ratios less than these values.

I claim:

1. Optical imaging apparatus comprising an objective window receiving an original record, means defining an image plane, a lens between the window and plane for focusing an image of the original on the plane, a light source, a first reflector adjacent said light source and a second reflector between said light source and one end of said window, and means masking direct rays from the source and first reflector to points on said window reflecting light to said lens, characterized in that said first reflector is shaped to distribute more light on portions of the second reflector closer to the window and said second reflector has a nonspecular, light diffusing surface, so that said window is illuminated predominantly with diffuse light distributed more intensely toward the end of said window than at the center.

2. Apparatus according to claim 1 wherein each of said reflectors and light source is symmetrically opposed respectively to a like reflector and a like light source.

3. Apparatus according to claim 1 wherein said objective window comprises a specularly reflecting transparent surface opposed to said lens.

4. Apparatus according to claim 1 wherein said nonspecular, diffuse reflecting surface comprises a highly reflective, matte finish white material.

5. Apparatus according to claim 1 wherein said second reflector comprises an area of different reflectivity from said surface, for modifying the distribution of light distributed to the record window.

6. Optical imaging apparatus having an objective window receiving an original record, means defining an optical plane, lens between the window and plane for focusing an image of the original on the plane, a light source, a first reflector adjacent said light source and a second reflector between said light source and one end of said window, and means masking direct rays from the source and first reflector to points on said window reflecting light to said lens, wherein said first reflector is shaped to distribute more light on portions of the second reflector closer to the window and said second reflector has a nonspecular, light-diffusing surface, so that said window is illuminated predominantly with diffuse light distributed more intensely toward the end of said window than at the center, and characterized in that two pairs of said first and second reflectors comprise opposed side walls of a light box extending from said window toward said lens.

7. Apparatus according to claim 6 wherein each of said reflectors and light source is symmetrically opposed respectively to a like reflector and a like light source.

8. Apparatus according to claim 6 characterized by reflecting end walls between the side walls of the light box.

9. Apparatus according to claim 8 wherein said end walls are specularly reflecting.

10. Apparatus according to claim 6 wherein each said first reflector is trough-shaped with a linear edge adjacent one said second reflector, said first reflector being pivoted lengthwise of said edge to permit adjustment of the light distribution on the second reflector of an opposed side wall.

11. Apparatus according to claim 6 wherein each said light source is mounted on one said first reflector to move therewith.

12. Apparatus according to claim 6 wherein each said first reflector is trough-shaped with a curved cross-section and each said second reflector is planar, said first and second reflectors having adjacent parallel edges.

13. Apparatus according to claim 12 wherein said light source is elongate and extends lengthwise of the trough.

14. Apparatus according to claim 13 wherein said elongate light source is stronger at its ends than in its mid-portion.

15. Optical imaging apparatus comprising an objective window receiving an original record, means defining an optical plane, a lens between the window and plane for focussing an image of the original on the plane, a light source, a first reflector adjacent said light source and a second reflector between said light source and one end of said window and means masking direct rays from the source and first reflector to points on said window reflecting light to said lens, wherein said first reflector is shaped to distribute more light on portions of the second reflector closer to the window and said second reflector has a nonspecular, light-diffusing surface, so that said window is illuminated predominantly with diffuse light distributed more intensely toward the end of said window than at the center, and characterized by a pair of third reflectors each having a nonspecular, diffuse reflecting surface and extending from said first reflector substantially to said lens.

16. Apparatus according to claim 15 wherein each of said reflectors and light source is symmetrically opposed respectively to a like reflector and to a like light source.

17. Apparatus according to claim 15 wherein one of said third reflectors is attached to each said first reflector to move therewith.

18. Apparatus according to claim 15 wherein one end of said third reflector is pivotally attached to said first reflector and a slideway adjacent said lens supports the other end of the third reflector.

19. Apparatus according to claim 15 wherein each said second reflector slopes inwardly of the platen toward said lens.

20. Apparatus according to claim 15 wherein said first reflector is trough-shaped with a curved cross-section and said second reflector is planar, said first and second reflectors having adjacent parallel edges.

21. Apparatus according to claim 15 wherein said non-specular, diffuse reflecting surface comprises a highly reflective, matte finish white material.

22. Apparatus according to claim 15 wherein said third reflector slopes inwardly of the platen toward said lens.

23. A printer according to claim 15 wherein said third reflector extends toward a diffuse reflecting wall surrounding the lens and facing said objective window.

24. Apparatus according to claim 16 wherein said masking means comprises a fourth reflector adjacent the first reflector and shaped to direct light from said source to an opposed one of said third reflectors.

25. Apparatus according to claim 24 characterized by reflecting end walls between the aforesaid side walls.

26. Apparatus according to claim 25 wherein said objective window comprises a specularly reflecting surface opposed to said lens.

27. Apparatus according to claim 26 wherein said reflectors, side wall and objective window substantially entirely enclose the space between said platen and lens to define a plurality of multiple reflection light paths each terminating in diffuse reflection to said record window, substantially every point of said second and third reflectors illuminating substantially every point of said window with diffuse light whereby specular reflection of diffuse incident light from the window to the lens is insignificant relative to light reflected by the record to the lens.

28. Apparatus according to claim 1 wherein said first reflector is adjusted to reflect light from said source directly to the end of the window adjacent said second reflector.

29. Apparatus according to claim 6 wherein said first reflector is adjusted to reflect light from said source directly to the end of the window adjacent said second reflector.

30. Apparatus according to claim 29 wherein each said first reflector is trough-shaped with a linear edge adjacent one said second reflector, said first reflector being pivoted lengthwise of said edge to permit adjustment of the light distribution on the second reflector of an opposed side wall and the ends of said objective window.

References Cited

UNITED STATES PATENTS

| | | | |
|---|---|---|---|
| 3,272,066 | 9/1966 | Rice | 88—24 |
| 3,272,067 | 9/1966 | White | 88—24 |
| 3,272,068 | 9/1966 | Couture | 88—24 |
| 3,312,143 | 4/1967 | Karow et al. | 88—24 |
| 3,316,804 | 5/1967 | Weisglass | 88—24 |

NORTON ANSHER, *Primary Examiner.*

R. A. WINTERCORN, *Assistant Examiner.*

U.S. Cl. X.R.

240—41.3; 355—70